United States Patent
Ji et al.

(10) Patent No.: US 9,485,068 B2
(45) Date of Patent: Nov. 1, 2016

(54) METHOD AND APPARATUS FOR MITIGATING PILOT POLLUTION IN A WIRELESS NETWORK

(71) Applicant: QUALCOMM Incorporated, San Diego, CA (US)

(72) Inventors: Tingfang Ji, San Diego, CA (US); Avneesh Agrawal, San Diego, CA (US); Alexei Y. Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 233 days.

(21) Appl. No.: 14/533,404

(22) Filed: Nov. 5, 2014

(65) Prior Publication Data

US 2015/0055611 A1  Feb. 26, 2015

Related U.S. Application Data

(63) Continuation of application No. 12/359,992, filed on Jan. 26, 2009, now Pat. No. 8,897,269.

(60) Provisional application No. 61/024,891, filed on Jan. 30, 2008.

(51) Int. Cl.
  *H04L 5/00* (2006.01)
  *H04L 1/00* (2006.01)
  (Continued)

(52) U.S. Cl.
  CPC .............. *H04L 5/0048* (2013.01); *H04L 1/001* (2013.01); *H04L 1/0004* (2013.01); *H04L 5/005* (2013.01);
  (Continued)

(58) Field of Classification Search
  None
  See application file for complete search history.

(56) References Cited

U.S. PATENT DOCUMENTS

| | | | |
|---|---|---|---|
| 8,064,837 | B2 | 11/2011 | Sampath |
| 2002/0155812 | A1 | 10/2002 | Takada |

(Continued)

FOREIGN PATENT DOCUMENTS

| | | |
|---|---|---|
| CN | 1891007 A | 1/2007 |
| CN | 101013915 A | 8/2007 |

(Continued)

OTHER PUBLICATIONS

Andrews J G, "Modulation, Coding and Signal Processing for Wireless Communications—Interference Cancellation for Celluar Systems: A Contemporary Overview" IEEE Wireless Communications, IEEE Service Center, Piscataway, NJ, US, vol. 12, No. 2, Apr. 1, 2005 (Apr. 1, 2005), pp. 19-29, XP011130570 ISSN 1536-1284.

(Continued)

*Primary Examiner* — Mohammad Adhami
(74) *Attorney, Agent, or Firm* — Ashish L. Patel

(57) ABSTRACT

Techniques for mitigating pilot pollution in a wireless network are described. In an aspect, pilot pollution may be mitigated by reducing density and/or transmit power of common pilots whenever possible. A cell may send a common pilot at a first density and a first transmit power level during a first time period and may send the common pilot at a second density and a second transmit power level during a second time period. The second density may be lower than the first density and/or the second transmit power level may be lower than the first transmit power level. Lower density may be achieved by sending the common pilot less frequently, on fewer subcarriers, and/or from fewer antennas. The cell may determine whether to reduce the density and/or transmit power of the common pilot based on network loading, SINRs of terminals, etc. In another aspect, pilot pollution may be mitigated by performing pilot cancellation at a terminal.

20 Claims, 7 Drawing Sheets

(51) Int. Cl.
    *H04W 52/24*    (2009.01)
    *H04W 52/32*    (2009.01)
    *H04W 52/34*    (2009.01)
    *H04L 1/18*     (2006.01)
    *H04L 25/02*    (2006.01)

(52) U.S. Cl.
    CPC .............. *H04L 5/006* (2013.01); *H04L 5/0057* (2013.01); *H04L 5/0062* (2013.01); *H04W 52/241* (2013.01); *H04W 52/243* (2013.01); *H04W 52/325* (2013.01); *H04W 52/343* (2013.01); *H04L 1/0026* (2013.01); *H04L 1/1812* (2013.01); *H04L 5/0044* (2013.01); *H04L 5/0053* (2013.01); *H04L 25/0224* (2013.01); *Y02B 60/50* (2013.01)

(56) References Cited

U.S. PATENT DOCUMENTS

| | | | |
|---|---|---|---|
| 2003/0119451 A1* | 6/2003 | Jang | H04B 1/7097 455/67.13 |
| 2004/0190482 A1 | 9/2004 | Baum et al. | |
| 2006/0007895 A1* | 1/2006 | Coralli | H04B 1/7107 370/335 |
| 2006/0172704 A1 | 8/2006 | Nishio et al. | |
| 2006/0183439 A1 | 8/2006 | Erceg | |
| 2007/0071145 A1 | 3/2007 | Perets | |
| 2007/0082692 A1 | 4/2007 | Tirkkonen et al. | |
| 2007/0104174 A1 | 5/2007 | Nystrom et al. | |
| 2007/0140160 A1 | 6/2007 | Lee et al. | |
| 2007/0149242 A1* | 6/2007 | Kim | H04J 11/004 455/525 |
| 2007/0165735 A1* | 7/2007 | Pan | H04B 1/7103 375/267 |
| 2007/0190945 A1* | 8/2007 | Lee | H04B 1/126 455/63.1 |
| 2008/0013488 A1 | 1/2008 | Garg et al. | |
| 2008/0056118 A1 | 3/2008 | Yu et al. | |
| 2008/0310530 A1 | 12/2008 | Imamura et al. | |
| 2009/0023392 A1 | 1/2009 | Iizuka et al. | |
| 2009/0175370 A1 | 7/2009 | Kuroda et al. | |
| 2009/0196165 A1 | 8/2009 | Morimoto et al. | |
| 2010/0020771 A1 | 1/2010 | Ji et al. | |

FOREIGN PATENT DOCUMENTS

| | | |
|---|---|---|
| CN | 101047401 A | 10/2007 |
| EP | 1542488 A1 | 6/2005 |
| JP | 2001036462 A | 2/2001 |
| JP | 2002077010 A | 3/2002 |
| JP | 2002271234 A | 9/2002 |
| JP | 2006510315 A | 3/2006 |
| JP | 2007019569 A | 1/2007 |
| JP | 2007074241 A | 3/2007 |
| JP | 2007514352 A | 5/2007 |
| JP | 2009513044 A | 3/2009 |
| RU | 2144731 C1 | 1/2000 |
| WO | WO-2004056022 A2 | 7/2004 |
| WO | WO-2005015797 | 2/2005 |
| WO | WO-2005060298 A1 | 6/2005 |
| WO | WO-2006078019 A1 | 7/2006 |
| WO | WO-2006138621 A2 | 12/2006 |
| WO | WO-2007013559 A1 | 2/2007 |
| WO | WO-2007036787 A2 | 4/2007 |
| WO | WO-2007042898 A1 | 4/2007 |
| WO | WO-2007125889 A1 | 11/2007 |
| WO | WO-2007129537 A1 | 11/2007 |

OTHER PUBLICATIONS

European Seach Report—EP12175674—Search Authority—Hague—Aug. 13, 2012.
International Search Report and Written Opinion—PCT/US2009/032159—ISA/EPO—Nov. 24, 2009.
Taiwan Search Report—TW098103295—TIPO—May 7, 2013.
Universal Mobile Telecommunications System (UMTS); Feasibility study on the mitigation of the effect of Common Pilot Channel (CPICH) interference at the user equipment (3GPP TR 25.991 version 5.1.0 Release 5); ETSI TR 125 991 ETSI Standards, Lis, Sophia Antipolis Cedex, France, vol. 3-R4, No. V5.1.0, Dec. 1, 2002 (Dec. 1, 2002), XP014015763 ISSN: 0000-0001 p. 7 p. 13-p. 14.
3GPP TR 25.991 V2.0.0, 3GPP TSG RAN, "Feasibility study on the mitigation of the effect of the Common Pilot Channl(CPICH) interference at the User Equipment," 12 Pages.
"3rd Generation Partnership Project; Technical Specification Group Radio Access Network; Feasibility study on the mitigation of the effect of the Common Pilot Channel (CPICH) interference at the User Equipment (Release 5)", 3GPP Standard; 3GPP TR 25.991, 3rd Generation Partnership Project (3GPP), Mobile Competence Centre ; 650, Route Des Lucioles ; F-06921 Sophia-Antipolis Cedex, France, No. V5.1.0, Dec. 1, 2002 (Dec. 1, 2002), pp. 1-28, XP014015763, Sections 4, 5.1.1, 5.1.2, 5.1.3, and 5.2.1.4.

* cited by examiner

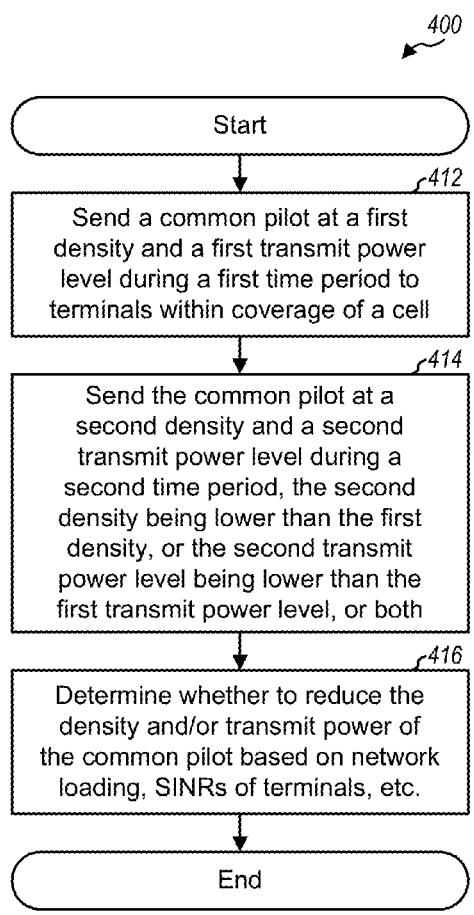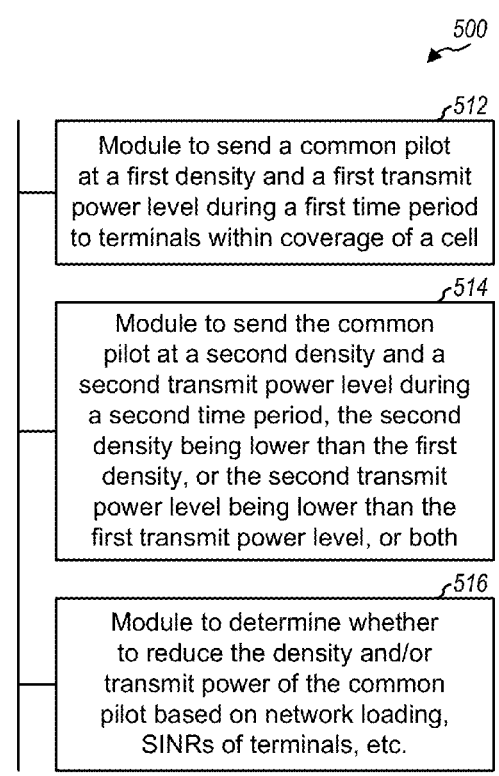
FIG. 4
FIG. 5

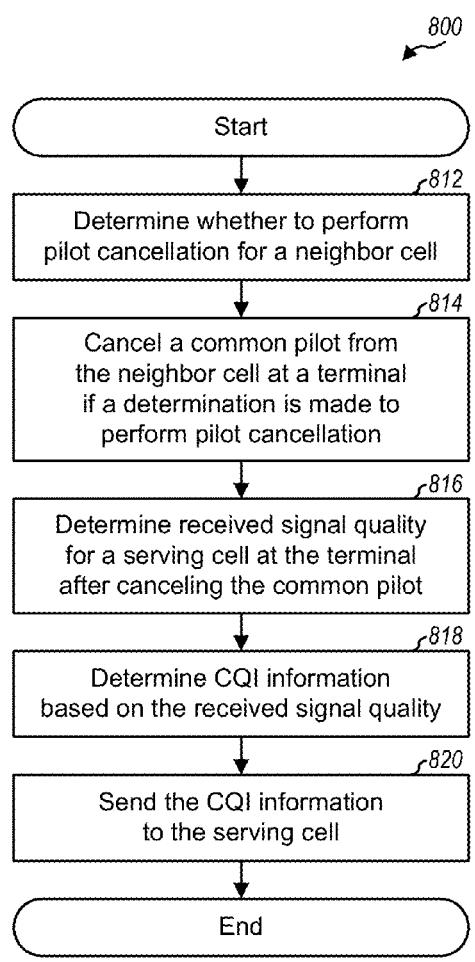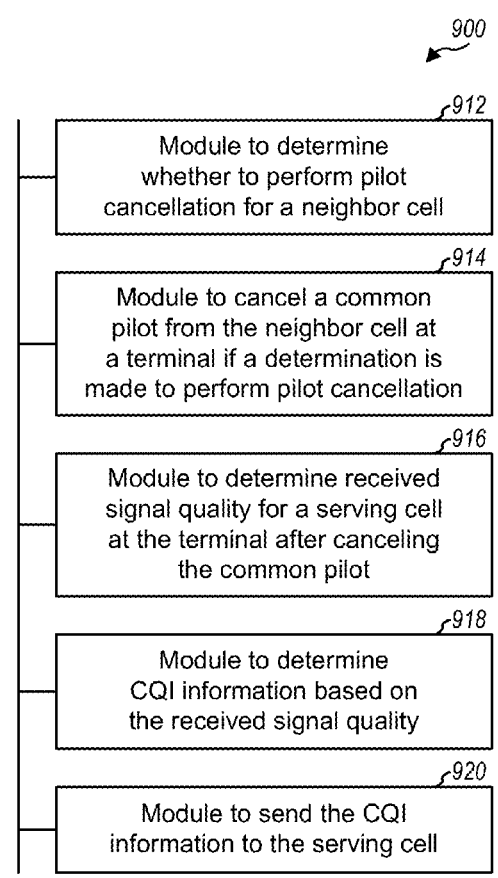
FIG. 8
FIG. 9

METHOD AND APPARATUS FOR MITIGATING PILOT POLLUTION IN A WIRELESS NETWORK

The present application is a continuation of, and claims priority to, U.S. application Ser. No. 12/359,992, filed on Jan. 26, 2009 and entitled "METHOD AND APPARATUS FOR MITIGATING PILOT POLLUTION IN A WIRELESS NETWORK," which in turn claims priority to provisional U.S. Application Ser. No. 61/024,891, entitled "METHOD AND APPARATUS FOR MITIGATING PILOT POLLUTION," filed Jan. 30, 2008. Both of the aforementioned applications are assigned to the assignee hereof and incorporated herein by reference.

BACKGROUND

I. Field

The present disclosure relates generally to communication, and more specifically to techniques for mitigating adverse impact due to pilots in a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of terminals. Each base station may support one or more cells and may periodically transmit one or more common pilots for each cell. A common pilot is a transmission that is known a priori by the terminals and is not associated with a transmission to a specific terminal. The common pilots from the cells may be used by the terminals for various purposes such as channel estimation, channel quality measurement, signal strength measurement, time/frequency tracking, etc. Information obtained from the common pilots (e.g., a channel estimate, a signal strength measurement, etc.) may be used for various tasks such as demodulation and decoding, serving cell selection, etc. It is desirable to send and receive the common pilots in a manner to achieve good performance.

SUMMARY

Techniques for mitigating pilot pollution in a wireless communication network are described herein. Pilot pollution refers to degradation in performance due to interference from common pilots sent by neighbor cells. A common pilot may be a cell-specific reference signal used for demodulation and decoding, a synchronization signal used for cell acquisition, etc.

In an aspect, pilot pollution may be mitigated by reducing density and/or transmit power of common pilots whenever possible. Density refers to how often a common pilot is sent and may be quantified by time, frequency, space, etc. In one design, a cell may send a common pilot at a first density and a first transmit power level during a first time period and may send the common pilot at a second density and a second transmit power level during a second time period. The second density may be lower than the first density and/or the second transmit power level may be lower than the first transmit power level. Lower density may be achieved by sending the common pilot less frequently, on fewer subcarriers, from fewer antennas, or a combination thereof. The cell may determine whether to reduce the density and/or transmit power of the common pilot based on network loading, offered loading at the cell, measured pilot pollution by terminals, signal-to-noise-and-interference ratios (SINRs) of terminals, pilot requirements of terminals, and/or other metrics.

In another aspect, pilot pollution may be mitigated by performing pilot cancellation at a terminal. In one design, the terminal may determine whether to perform pilot cancellation for a neighbor cell. For example, the terminal may decide to perform pilot cancellation if the neighbor cell is one of M strongest neighbor cells, if the received signal strength for the neighbor cell exceeds a threshold, if the neighbor cell is identified by a serving cell, if network loading is light, if a required SINR of the terminal is high, etc. The terminal may cancel a common pilot from the neighbor cell if a determination is made to perform pilot cancellation. For pilot cancellation, the terminal may first obtain a channel estimate for the neighbor cell based on a received signal at the terminal. The terminal may then estimate interference due to the common pilot from the neighbor cell based on a locally generated common pilot and the channel estimate. The terminal may subtract the estimated interference from the received signal to obtain an interference-canceled signal. The terminal may perform pilot cancellation for other common pilots from the same neighbor cell and/or from other neighbor cells.

Various aspects and features of the disclosure are described in further detail below.

BRIEF DESCRIPTION OF THE DRAWINGS

FIG. 4 shows a process for sending common pilots.

FIG. 5 shows an apparatus for sending common pilots.

FIG. 8 shows a process for performing pilot cancellation.

FIG. 9 shows an apparatus for performing pilot cancellation.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE.

Figure 1:
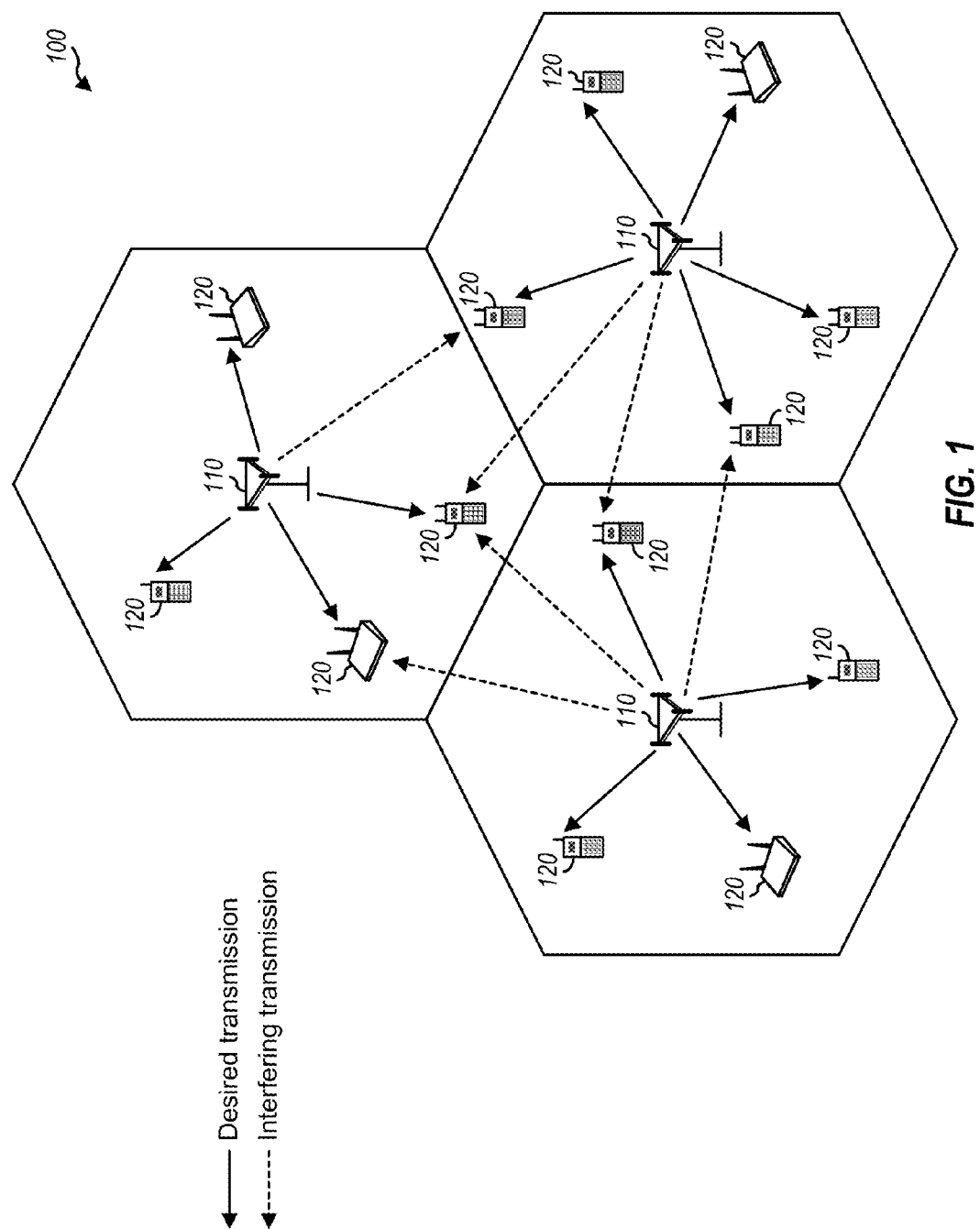
FIG. 1 shows a wireless communication network.

FIG. 1 shows a wireless communication network 100, which may include a number of base stations 110 and other network entities. A base station may be a station that communicates with the terminals and may also be referred to as an access point, a Node B, an evolved Node B (eNB), etc. A base station may provide communication coverage for a particular geographic area. The overall coverage area of a base station may be partitioned into smaller areas, and each smaller area may be served by a respective base station subsystem. The term "cell" can refer to a coverage area of a base station and/or a base station subsystem serving this coverage area.

A base station may provide communication coverage for a macro cell, a pico cell, a femto cell, or some other type of cell. A macro cell may cover a relatively large geographic area (e.g., several kilometers in radius) and may support communication for terminals with service subscription in the wireless network. A pico cell may cover a relatively small geographic area and may support communication for all terminals with service subscription. A femto cell may cover a relatively small geographic area (e.g., a home) and may support communication for terminals having association with the femto cell (e.g., terminals belonging to residents of the home).

Terminals 120 may be dispersed throughout wireless network 100, and each terminal may be stationary or mobile. A terminal may also be referred to as an access terminal (AT), a mobile station (MS), a user equipment (UE), a subscriber unit, a station, etc. A terminal may be a cellular phone, a personal digital assistant (PDA), a wireless modem, a wireless communication device, a handheld device, a laptop computer, a cordless phone, a wireless local loop (WLL) station, etc. A terminal may communicate with a base station via the downlink and uplink. The downlink (or forward link) refers to the communication link from the base station to the terminal, and the uplink (or reverse link) refers to the communication link from the terminal to the base station.

In FIG. 1, a solid line with a single arrow indicates a desired transmission from a serving cell to a terminal. A dashed line with a single arrow indicates an interfering transmission from a neighbor cell to a terminal. A serving cell is a cell designated to serve a terminal on the downlink and/or uplink. Uplink transmissions are not shown in FIG. 1 for simplicity.

In wireless network 100, each base station 110 may periodically transmit one or more common pilots for each cell in that base station. A common pilot may also be referred to as a reference signal, a common reference signal, etc. Different types of common pilot may be used for different purposes and may be referred to by different names. For example, a common pilot used for channel estimation, channel quality measurement, signal strength measurement, and time/frequency tracking may be referred to as a cell-specific reference signal, a sounding signal, a training signal, etc. A common pilot used for cell acquisition may be referred to as a synchronization signal.

Figure 2:
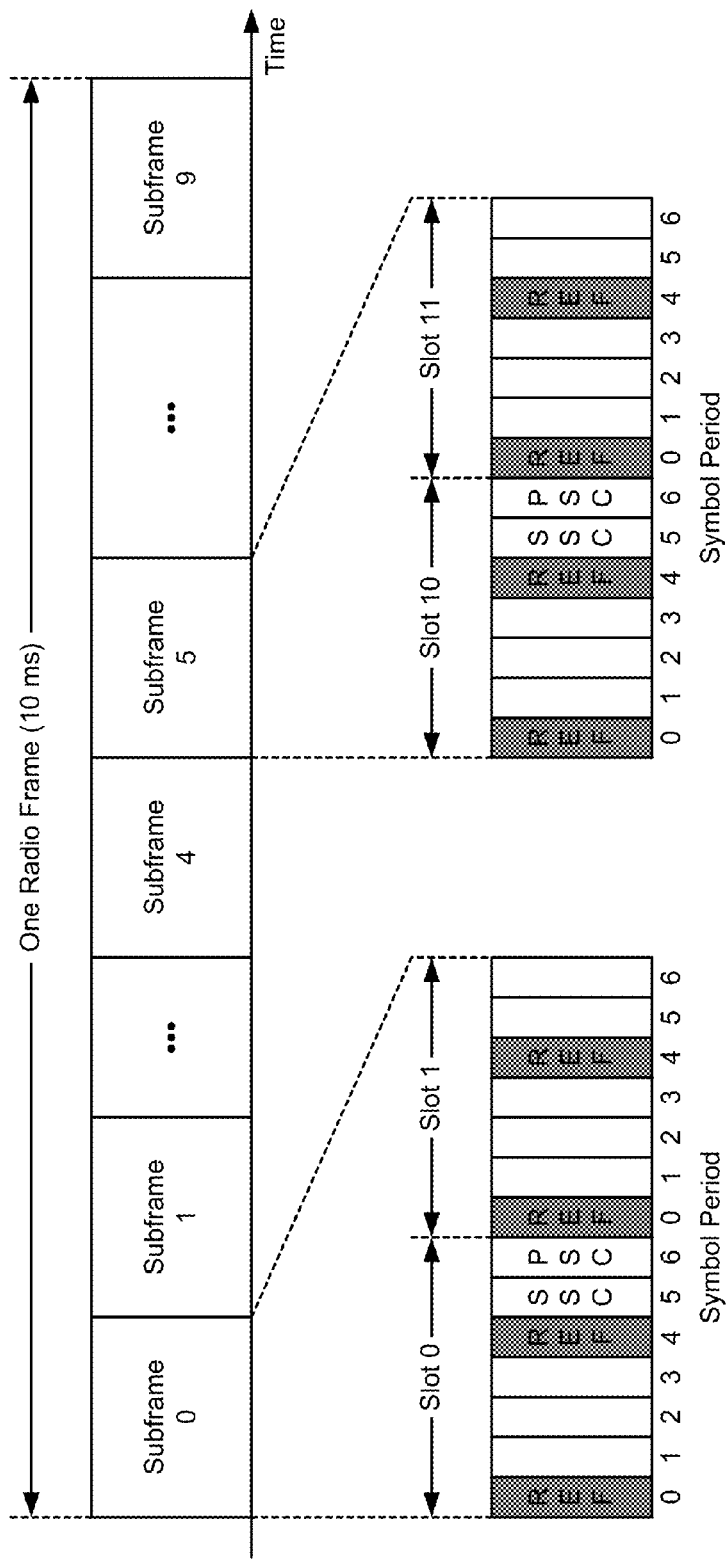
FIG. 2 shows example transmission of common pilots for one cell.

FIG. 2 shows example transmission of common pilots for one cell in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may cover a fixed or configurable number of symbol periods, e.g., six symbol periods for an extended cyclic prefix (not shown in FIG. 2) or seven symbol periods for a normal cyclic prefix (as shown in FIG. 2).

For the normal cyclic prefix, each slot includes seven symbol periods with indices of 0 through 6. A cell-specific reference signal (denoted as REF) may be sent in symbol periods 0 and 4 of each slot in each radio frame. A primary synchronization signal (denoted as PSC) and a secondary synchronization signal (denoted as SSC) may be sent in symbol periods 6 and 5, respectively, of each of slots 0 and 10 in each radio frame. The cell-specific reference signal and the synchronization signals for LTE may be generated and sent as described 3GPP TS 36.211, entitled "Evolved Universal Terrestrial Radio Access (E-UTRA); Physical Channels and Modulation," which is publicly available.

In general, any number of common pilots may be sent for each cell, and each common pilot may be sent at any periodicity. The common pilots may comprise the cell-specific reference signal and the primary and secondary synchronization signals in LTE. The common pilots may also comprise a forward link common pilot, time division multiplexed (TDM) pilots, and a beacon pilot in UMB. The common pilots may also comprise other signals in other wireless networks and other radio technologies.

Wireless network 100 may utilize orthogonal frequency division multiplexing (OFDM) and/or single-carrier frequency division multiplexing (SC-FDM). OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 MHz, respectively. The system bandwidth may also be partitioned into subbands, and each subband may cover a predetermined number of subcarriers, e.g., 72 subcarriers in LTE.

Figures 3A, 3B:
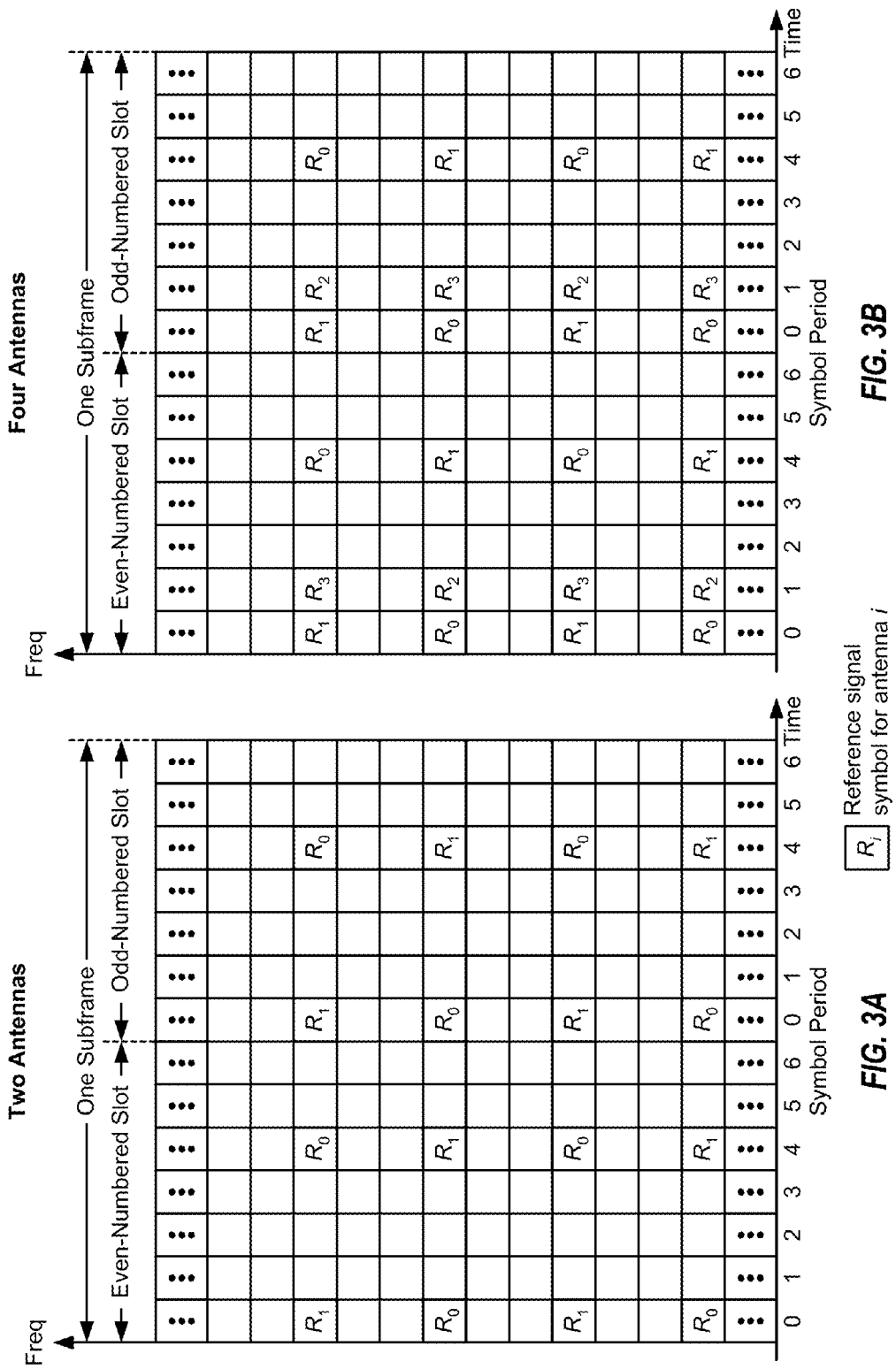
FIGS. 3A and 3B show transmission of a cell-specific reference signal from two antennas and four antennas, respectively.

FIG. 3A shows example transmission of the cell-specific reference signal from two antennas for one cell with the normal cyclic prefix. Time-frequency resources available for transmission may be partitioned into resource blocks, with each resource block covering 12 subcarriers in one slot. Each resource block may include 84 resource elements for the normal cyclic prefix, and each resource element may correspond to one subcarrier in one symbol period. For simplicity, only two resource blocks in two slots of one subframe are shown in FIG. 3A. A first subcarrier set may include the first and seventh subcarriers in each resource block (counting from the bottom in FIG. 3A), and a second subcarrier set may include the fourth and tenth subcarriers in each resource block.

For antenna 0, the cell-specific reference signal may be sent on the first subcarrier set in symbol period 0 of each slot and on the second subcarrier set in symbol period 4 of each slot. For antenna 1, the cell-specific reference signal may be sent on the second subcarrier set in symbol period 0 of each slot and on the first subcarrier set in symbol period 4 of each slot. For each antenna, no transmission may be sent on resource elements used to send the cell-specific reference signal from the other antenna.

FIG. 3B shows example transmission of the cell-specific reference signal from four antennas for one cell with the normal cyclic prefix. The cell-specific reference signal may be sent from antennas 0 and 1 as described above for FIG. 3A. For antenna 2, the cell-specific reference signal may be sent on the first subcarrier set in symbol period 1 of each even-numbered slot and on the second subcarrier set in symbol period 1 of each odd-numbered slot. For antenna 3, the cell-specific reference signal may be sent on the second subcarrier set in symbol period 1 of each even-numbered slot and on the first subcarrier set in symbol period 1 of each odd-numbered slot. For each antenna, no transmission may be sent on resource elements used to send the cell-specific reference signal from other antennas.

As shown in FIGS. 2, 3A and 3B, different types of common pilot may be sent for each cell. The common pilots may have relatively low overhead (in terms of bandwidth and power) and may be used by all terminals for various purposes. However, the common pilots may cause pilot pollution, which may occur due to more common pilots being sent than necessary for a given operating scenario. Pilot pollution may degrade performance in different manners depending on how the common pilots are sent. For example, pilot pollution may result in the following:

Poor channel estimation performance and inaccurate interference estimation due to common pilots from neighbor cells colliding with common pilots from a serving cell, and Lower received signal quality for data transmission due to common pilots from neighbor cells colliding with data from the serving cell.

Received signal quality may be quantified by SINR, signal-to-noise ratio (SNR), carrier-to-interference ratio (C/I), etc. For clarity, SINR is used to denote received signal quality in much of the description herein.

In an aspect, pilot pollution may be mitigated by reducing the density and/or transmit power of common pilots whenever possible. Sending the common pilots with higher density and/or higher transmit power may improve performance of channel estimation, demodulation and decoding, channel quality measurement, signal strength measurement, rate prediction, channel quality indicator (CQI) reporting, etc. However, sending the common pilots with higher density and/or higher transmit power may also increase the likelihood and/or severity of pilot pollution. The density and/or transmit power of the common pilots may be reduced whenever possible based on a tradeoff between performance and pilot pollution.

In one design, the density and/or transmit power of the common pilots may be selectively reduced based on network loading. For moderate and heavy network loading, the common pilots may be sent in the normal manner, e.g., at a nominal density and a nominal transmit power level. For light/low network loading, the common pilots may be sent in a reduced manner, e.g., at a lower density and/or a lower transmit power level. Network loading may be quantified by the number of terminals being served, the total amount of data for all terminals being served, the total amount of resources (e.g., bandwidth) used for the terminals being served, the percentage of resources used for the terminals being served, etc. One or more thresholds may be used to determine whether the network loading is light, moderate, heavy, etc. Transmission of the common pilots may then be controlled based on the detected network loading. For example, a single threshold may be used to determine whether or not the network loading is light, e.g., due to only small signaling messages and/or VoIP frames being sent. The common pilots may be (i) sent in the normal manner if the network loading is not light or (ii) sent with lower density and/or lower transmit power if the network loading is light.

In another design, the density and/or transmit power of the common pilots may be selectively reduced based on pilot pollution observed by terminals. A terminal may observe high SINR due to light network loading, low duty cycle of data and possibly control transmissions in neighbor cells, etc. For terminals observing or requiring high SINR, even a small amount of interference due to common pilots from neighbor cells may cause a substantial loss in SINR. This may be especially true in an interference-limited deployment in which transmissions from neighbor cells dominate over thermal noise level observed by the terminals. The degradation in SINR due to pilot pollution may become a primary limitation of user experience in a partially loaded network. SINR degradation may be dependent on a pilot-interference-to-total-interference-and-noise ratio ($I_{pilot}/I_{total}$). The total interference and noise ($I_{total}$) may include thermal noise, interference from data transmission, and interference from common pilots ($I_{pilot}$). $I_{pilot}/I_{total}$ may be used as a metric for pilot pollution observed by a terminal. High SINR may be a special case when the total interference and noise is low. In any case, the common pilots may be reduced when the terminals being served observe high pilot pollution (e.g., high $I_{pilot}/I_{total}$). A threshold (e.g., an $I_{pilot}/I_{total}$ threshold) may be used to determine whether or not a terminal observes high pilot pollution. In one design, the neighbor cells may be requested to reduce the density and/or transmit power of their common pilots when the terminals being served observe high pilot pollution. In another design, the serving cell may reduce the density and/or transmit power of its common pilots when the terminals being served observe high pilot pollution.

The density and/or transmit power of the common pilots may be selectively reduced based on other criteria besides network loading and observed pilot pollution. For example, the density and/or transmit power of the common pilots may be selectively reduced based on offered loading at a serving cell, SINRs of terminals, pilot requirements of terminals, user interference ratio at neighbor cells, etc. The offered loading at the serving cell may be given by a maximum data rate supported by the cell, the amount of radio resources available in the cell, etc.

The density and/or transmit power of the common pilots may be reduced in various manners. In one design, the transmit power of the common pilots may be reduced by sending the common pilots at a lower transmit power level. For example, the cell-specific reference signal may be sent at a nominal transmit power level under normal operating scenarios and at a lower transmit power level for light network loading and/or high SINR scenarios. The transmit power level may be given by a power spectral density (PSD), a transmit power relative to one milli-Watt (dBm), etc. For example, the PSD of the cell-specific reference signal may be reduced when no downlink traffic is served and/or the served terminals obverse good SINR conditions.

In another design, the density of the common pilots may be reduced by sending the common pilots less frequently in time. For example, the cell-specific reference signal may be sent in every N-th slot instead of every slot, where N may be any value greater than one. The cell-specific reference signal may also be sent in fewer symbol periods (e.g., one symbol period) in each slot in which it is sent. The cell-specific reference signal may also be sent with data and/or control transmissions and may be muted or disabled otherwise.

In yet another design, the density of the common pilots may be reduced by sending the common pilots on fewer subcarriers across frequency. For example, the cell-specific reference signal may be sent on every L-th subcarriers, where L may be any value greater than 6. The cell-specific reference signal may also be sent on a portion of the system bandwidth instead of across the entire system bandwidth.

In yet another design, the density of the common pilots may be reduced by sending the common pilots from fewer antennas and/or reducing the density and/or transmit power of the common pilots on each antenna. The common pilots may be sent from all antennas under normal operating scenarios and from fewer antennas for light network loading and/or high SINR scenarios. For example, the common pilots may be reduced from four antennas down to two antennas or one antenna, or reduced from two antennas down to one antenna. The common pilots on each antenna may also be reduced by sending the common pilots less frequently, on fewer subcarriers, and/or at a lower transmit power level. The density and/or transmit power of the common pilots may be reduced by the same amount for all antennas or by different amounts for different antennas. For example, the common pilots on antenna 1 may be reduced more than the common pilots on antenna 0.

In one design, the common pilots may be divided into two portions, e.g., a configurable portion and a non-configurable portion. The configurable portion may be reduced based on any of the criteria described above, e.g., network loading, observed pilot pollution, etc. The non-configurable portion may be maintained fixed. For example, the common pilots may be divided into a non-loading based portion and a loading-based portion. The loading-based portion may be reduced based on low or no traffic, the terminals being served not requiring high pilot density, etc.

In one design, the common pilots may be sent continually on one or more antennas, which may be a subset of the available antennas. The always-available (and non-configurable) common pilots may be used for various tasks such as pilot measurements, demodulation for data transmission sent at low to medium rates, etc. Supplemental (and configurable) common pilots may be sent on one or more additional antennas when there are scheduled downlink transmissions that make use of the additional antenna(s).

In general, the common pilots may be sent at a lower density and/or a lower transmit power level in order to mitigate pilot pollution. Reduced common pilots are common pilots sent at lower density and/or lower transmit power. Lower density may be achieved by sending the common pilots less frequently, on fewer subcarriers, and/or from fewer antennas. Pilot reduction may be applicable to any common pilot such as the cell-specific reference signal, the synchronization signals, etc. In one design, a cell may reduce the density and/or transmit power of its common pilots without informing the terminals. In another design, the cell may broadcast the format of the reduced common pilots on a control channel to the terminals.

In one design, adjacent cells may send reduced common pilots using time division multiplexing (TDM), frequency division multiplexing (FDM), or some other multiplexing scheme. The common pilots from each cell may thus avoid the common pilots and data from neighbor cells. In one design of TDM, the transmission timeline may be partitioned into intervals, and each cell may send its common pilots and data in intervals reserved for that cell. In one design of FDM, the system bandwidth may be partitioned into non-overlapping subcarrier sets, with each set including contiguous or non-contiguous subcarriers not included in other sets. Each cell may send its common pilots and data on a subcarrier set reserved for that cell. The multiplexing may be dependent on the manner in which the density of the common pilots is reduced. For example, TDM may be used if the common pilots are sent less frequently, and FDM may be used if the common pilots are sent on fewer subcarriers. The multiplexing of common pilots from adjacent cells may further mitigate pilot pollution.

The common pilots may be used for various purposes and tasks, as described above. Reducing the density and/or transmit power of the common pilots may adversely impact performance. Performance degradation may be mitigated in various manners, as described below.

The common pilots may be used as a reference signal for serving cell selection. Reducing the density and/or transmit power of the common pilots may impact measurements of signal strength and/or channel quality, which may result in selection of a cell transmitting the common pilots at higher density and/or higher transmit power. In one design, a common pilot used for serving cell selection (e.g., the primary and/or secondary synchronization signal) may be sent at a constant transmit power level. The common pilots not used for serving cell selection (e.g., the cell-specific reference signal) may be sent at a lower transmit power level. In another design, a low overhead pilot may be sent at a constant transmit power level and used for serving cell selection. The low overhead pilot may be sent less frequently (e.g., once every radio frame or every N-th radio frames) than other common pilots and/or on fewer subcarriers in order to reduce overhead.

The common pilots may be used for channel estimation, and a channel estimate may be used for demodulation and/or decoding of data and/or control transmissions. Reducing the density and/or transmit power of the common pilots may degrade the channel estimate, which may in turn degrade decoding performance. In one design, a modulation and coding scheme (MCS) may be selected by taking into account degradation in channel estimation due to reduced common pilots. The selected MCS may have a lower code rate and/or a lower order modulation scheme due to a degraded channel estimate. In another design, data and control information for a terminal may be sent as close to the common pilots as possible in order to reduce performance degradation.

Correct decoding of control information may be important, e.g., in order to properly receive and process data. The common pilots used for demodulating and decoding control information may be maintained at a sufficient level in order to ensure good decoding performance for control information. In one design, control information and data may be sent in different time regions with TDM. In this design, the common pilots in a control region may be maintained or slightly reduced whereas the common pilots in a data region may be shut off or more significantly reduced.

The common pilots may be used for CQI measurement and reporting. Since a CQI report may be sent infrequently, the density and/or transmit power of the common pilots may be reduced while minimally impacting CQI reporting. In one design, a certain minimum level of common pilots may be sent to support CQI measurement and reporting pilot.

FIG. 4 shows a design of a process 400 for sending common pilots in a wireless network. Process 400 may be performed by a cell (as described below) or some other entity. The cell may send a common pilot at a first density and a first transmit power level during a first time period to terminals within detection range of the cell (block 412). The cell may send the common pilot at a second density and a second transmit power level during a second time period (block 414). The second density may be lower than the first density and/or the second transmit power level may be lower than the first transmit power level. The common pilot may comprise a cell-specific reference signal used for channel estimation and other purposes by terminals, a synchronization signal used for cell acquisition and selection by the terminals, and/or other signals used for other purposes.

The cell may determine whether to reduce the density and/or transmit power of the common pilot based on network loading, offered loading at a cell, measured pilot pollution by terminals, SINRs of terminals, pilot requirements of terminals, etc. (block 416). For example, the network loading may be light during the second time period and not light during the first time period. As another example, the SINRs of the terminals may be high during the second time period and lower during the first time period. In another design, the first time period may be for control information and the second period may be for data. The cell may send control information during the first time period and may send data during the second time period. In any case, the cell may send information indicating a format of the common pilot.

In one design, the cell may send the common pilot at a lower density but the same transmit power level during the second time period as compared to the first time period. To achieve lower density, the cell may send the common pilot less frequently, or on fewer subcarriers, or from fewer antennas, or a combination thereof. In another design, the cell may send the common pilot at the same density but a lower transmit power level during the second time period as compared to the first time period.

In one design, the cell may select a first MCS for a terminal during the first time period and may select a second MCS for the terminal during the second time period. The common pilot may be used for channel estimation by the terminal. The second MCS may be lower than the first MCS to account for degradation in channel estimation during the second time period. The cell may send data near the common pilot during the second time period in order to improve decoding performance for the data.

In one design, the cell may send a second common pilot at a constant transmit power level and lower density (e.g., less frequently) than the common pilot mentioned above. The second common pilot may be used by the terminals for serving cell selection and/or other purposes.

In one design, adjacent cells may send their common pilots in different intervals during the second time period with TDM. In another design, the adjacent cells may send their common pilots on different sets of subcarriers during the second time period with FDM. The adjacent cells may also send their common pilots based on other multiplexing schemes.

FIG. 5 shows a design of an apparatus 500 for sending common pilots in a wireless network. Apparatus 500 includes a module 512 to send a common pilot at a first density and a first transmit power level during a first time period to terminals within detection range of a cell, a module 514 to send the common pilot at a second density and a second transmit power level during a second time period, with the second density being lower than the first density and/or the second transmit power level being lower than the first transmit power level, and a module 516 to determine whether to reduce the density and/or transmit power of the common pilot based on network loading, SINRs of terminals, etc.

Figure 6:
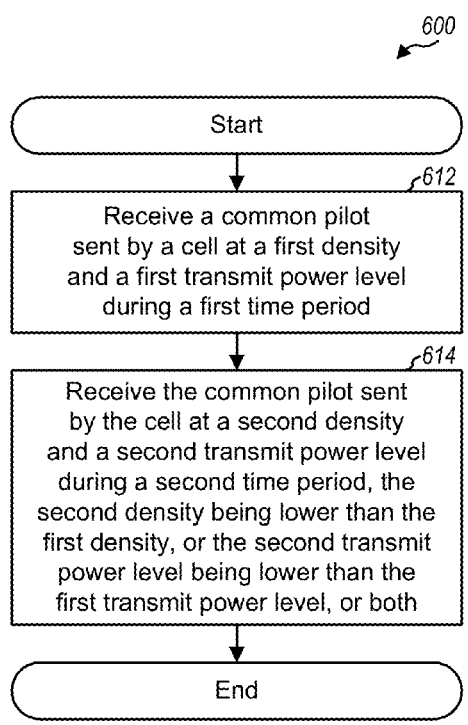
FIG. 6 shows a process for receiving common pilots.

FIG. 6 shows a design of a process 600 for receiving common pilots in a wireless network. Process 600 may be performed by a terminal (as described below) or some other entity. The terminal may receive a common pilot sent by a cell at a first density and a first transmit power level during a first time period (block 612). The terminal may receive the common pilot sent by the cell at a second density and a second transmit power level during a second time period (block 614). The second density may be lower than the first density and/or the second transmit power level may be lower than the first transmit power level. The terminal may receive information indicating the format of the common pilot from the cell and may receive the common pilot in accordance with the format.

In one design, the terminal may perform channel estimation based on the common pilot. The terminal may receive data sent by the cell in accordance with a first MCS during the first time period and may receive data sent by the cell in accordance with a second MCS during the second time period. The second MCS may be lower than the first MCS to account for degradation in channel estimation during the second time period.

In one design, the terminal may receive a second common pilot sent by the cell at a constant transmit power level and lower density (e.g., less frequently) than the common pilot. The terminal may use the first and/or second common pilot to select a serving cell.

Figure 7:
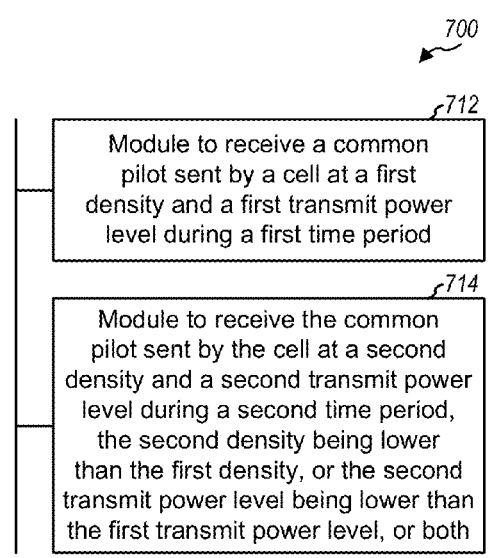
FIG. 7 shows an apparatus for receiving common pilots.

FIG. 7 shows a design of an apparatus 700 for receiving common pilots in a wireless network. Apparatus 700 includes a module 712 to receive a common pilot sent by a cell at a first density and a first transmit power level during a first time period, and a module 714 to receive the common pilot sent by the cell at a second density and a second transmit power level during a second time period, with the second density being lower than the first density and/or the second transmit power level being lower than the first transmit power level.

In another aspect, pilot pollution may be mitigated by performing pilot cancellation at a terminal A common pilot from a neighbor cell may interfere with a common pilot and/or data from a serving cell. The terminal may estimate interference due to the common pilot from the neighbor cell and may cancel the estimated interference from a received signal at the terminal. In general, the terminal may estimate and cancel interference due to any set of common pilots sent by any number of neighbor cells. The terminal may process an interference-canceled signal to recover data and/or other information from the serving cell. Pilot cancellation may be performed for common pilots sent in the normal manner as well as for reduced common pilots sent at lower density and/or lower transmit power.

Pilot cancellation may be performed in various manners. In one design, a terminal may perform pilot cancellation for M strongest neighbor cells, where M may be a value of one or greater. The terminal may measure the received signal strength of all neighbor cells, rank the neighbor cells based on their received signal strength, and select the M strongest neighbor cells to perform pilot cancellation.

In another design, the terminal may perform pilot cancellation for each neighbor cell having sufficiently strong received signal strength at the terminal and considered as a dominant interferer to the terminal. A neighbor cell may be considered as a dominant interferer if its received signal strength exceeds a threshold, which may be a fixed value or a configurable value. A configurable threshold may be determined based on total interference and noise at the terminal. The terminal may perform pilot cancellation for a variable number of neighbor cells in this design.

In yet another design, the terminal may perform pilot cancellation based on SINR and/or network loading. For example, the terminal may perform pilot cancellation for high SINR scenarios (e.g., if a required SINR for the terminal exceeds a threshold) and may skip pilot cancellation for low SINR scenarios. The terminal may also perform pilot cancellation only if the network loading is light and interference at the terminal is dominant by the common pilots from the neighbor cells.

In yet another design, the terminal may perform pilot cancellation as indicated by the serving cell. For example, the serving cell may inform the terminal of which neighbor cells to search for, which common pilots to detect, the format of each common pilot, etc. The terminal may then perform pilot cancellation for the neighbor cells and/or the common pilots indicated by the serving cell.

The terminal may perform pilot cancellation based on any one or any combination of the designs described above. These designs may reduce device cost and/or power consumption associated with pilot cancellation.

The terminal may perform pilot cancellation for a common pilot from a neighbor cell as follows. The terminal may locally generate the common pilot from the neighbor cell and may correlate a received signal with the locally generated common pilot. This processing may be referred to as common pilot demodulation. The terminal may then process the results of the common pilot demodulation to obtain a channel estimate for the neighbor cell. The terminal may apply the channel estimate to the locally generated common pilot to estimate interference due to the common pilot. The terminal may then subtract the estimated interference from the received signal to obtain an interference-canceled signal. The terminal may repeat the process for each common pilot of each neighbor cell to be canceled. Pilot cancellation may also be performed in other manners.

The terminal may perform common pilot demodulation for a neighbor cell for various tasks such as control channel demodulation, signal strength measurement, etc. In this case, pilot cancellation may be an additional step that makes use of the results of the common pilot demodulation. Alternatively, the terminal may perform common pilot demodulation just for pilot cancellation.

In one design, adjacent cells may send their common pilots on the same resources, and the common pilots from these cells may overlap one another in time and frequency. In this design, the terminal may perform joint channel estimation for the serving cell as well as one or more neighbor cells, e.g., using minimum mean square error (MMSE) techniques. The terminal may obtain channel estimates of higher quality using joint estimation. The terminal may observe lower pilot SINR compared to data SINR, especially when the network loading is light and in the absence of pilot cancellation. Performance may then be dominated by poor channel estimation for terminals located at cell edge and observing high pilot interference from one or more strong interfering cells. The edge terminals may perform pilot cancellation in order to improve performance.

In another design, adjacent cells may send their common pilots on different resources, which may be randomized across different cells. In this design, the common pilots and data from each cell may observe similar average SINR. Pilot pollution may degrade both pilot and data SINRs and may define an SINR ceiling when network loading is light, e.g., when the network loading is comparable to or lower than the overhead of the common pilots. Pilot cancellation may be used to improve both pilot and data SINRs.

FIG. 8 shows a design of a process 800 for performing pilot cancellation. Process 800 may be performed by a terminal (as described below) or some other entity. The terminal may determine whether to perform pilot cancellation for a neighbor cell (block 812). The terminal may cancel a common pilot from the neighbor cell if a determination is made to perform pilot cancellation (block 814). The common pilot may be sent on resource elements scattered across time and frequency, e.g., as shown in FIGS. 3A and 3B. The terminal may determine received signal quality for a serving cell after canceling the common pilot (block 816). The terminal may determine CQI information based on the received signal quality (block 818). The CQI information may comprise one or more SINR estimates, one or more modulation and coding schemes, etc. The terminal may send the CQI information to the serving cell, which may use the CQI information for data transmission to the terminal (block 820).

In one design of block 812, the terminal may decide to perform pilot cancellation if the neighbor cell is one of M strongest neighbor cells or if received signal strength for the neighbor cell exceeds a threshold. In another design, the terminal may determine whether to perform pilot cancellation based on network loading, a required SINR of the terminal, and/or other criteria. In yet another design, the terminal may determine whether to perform pilot cancellation based on information received from the serving cell. The information may identify at least one neighbor cell to perform pilot cancellation and/or at least one common pilot to perform pilot cancellation.

In one design of block 814, the terminal may obtain a channel estimate for the neighbor cell based on a received signal at the terminal. The terminal may then estimate interference due to the common pilot from the neighbor cell based on a locally generated common pilot for the neighbor cell and the channel estimate. The terminal may then subtract the estimated interference from the received signal to obtain an interference-canceled signal. The terminal may perform pilot cancellation for other common pilots from the neighbor cell and/or from other neighbor cells.

FIG. 9 shows a design of an apparatus 900 for performing pilot cancellation. Apparatus 900 includes a module 912 to determine whether to perform pilot cancellation for a neighbor cell, a module 914 to cancel a common pilot from the neighbor cell at a terminal if a determination is made to perform pilot cancellation, a module 916 to determine received signal quality for a serving cell at the terminal after canceling the common pilot, a module 918 to determine CQI information based on the received signal quality, and a module 920 to send the CQI information to the serving cell.

The modules in FIGS. 5, 7 and 9 may comprise processors, electronics devices, hardware devices, electronics components, logical circuits, memories, etc., or any combination thereof.

In another design, the terminal may perform pilot cancellation but may compute SINR without taking into account pilot cancellation, i.e., with un-canceled interference. The computed SINR may be worse than the actual SINR with pilot cancellation. The terminal may determine CQI information based on the computed SINR without pilot cancellation and may send the CQI information to the serving cell. The serving cell may have knowledge that the terminal performs pilot cancellation and may send data to the terminal by taking into account the difference between the actual and reported SINRs. For example, the serving cell may send a number of HARQ transmissions for a packet to the terminal and may target a later H-ARQ termination. In particular, the serving cell may select a modulation and coding scheme based on the reported SINR such that the terminal can recover the packet with a target number of HARQ transmissions. Since the actual SINR at the terminal may be better than the reported SINR, the terminal may be able to recover the packet with fewer HARQ transmissions and may terminate earlier than the HARQ termination target, as expected by the serving cell.

The pilot reduction and pilot cancellation techniques described herein may improve performance for wireless networks operating at partial loading most of the time. This kind of network deployment may allow network operators to ensure sufficiently high capacity at peak load (which may occur infrequent) while providing superior user experience due to higher data rates and lower latencies most of the time when network load stays relatively light. The techniques may also improve performance for certain operating scenarios, e.g., high SINR scenarios.

Figure 10:
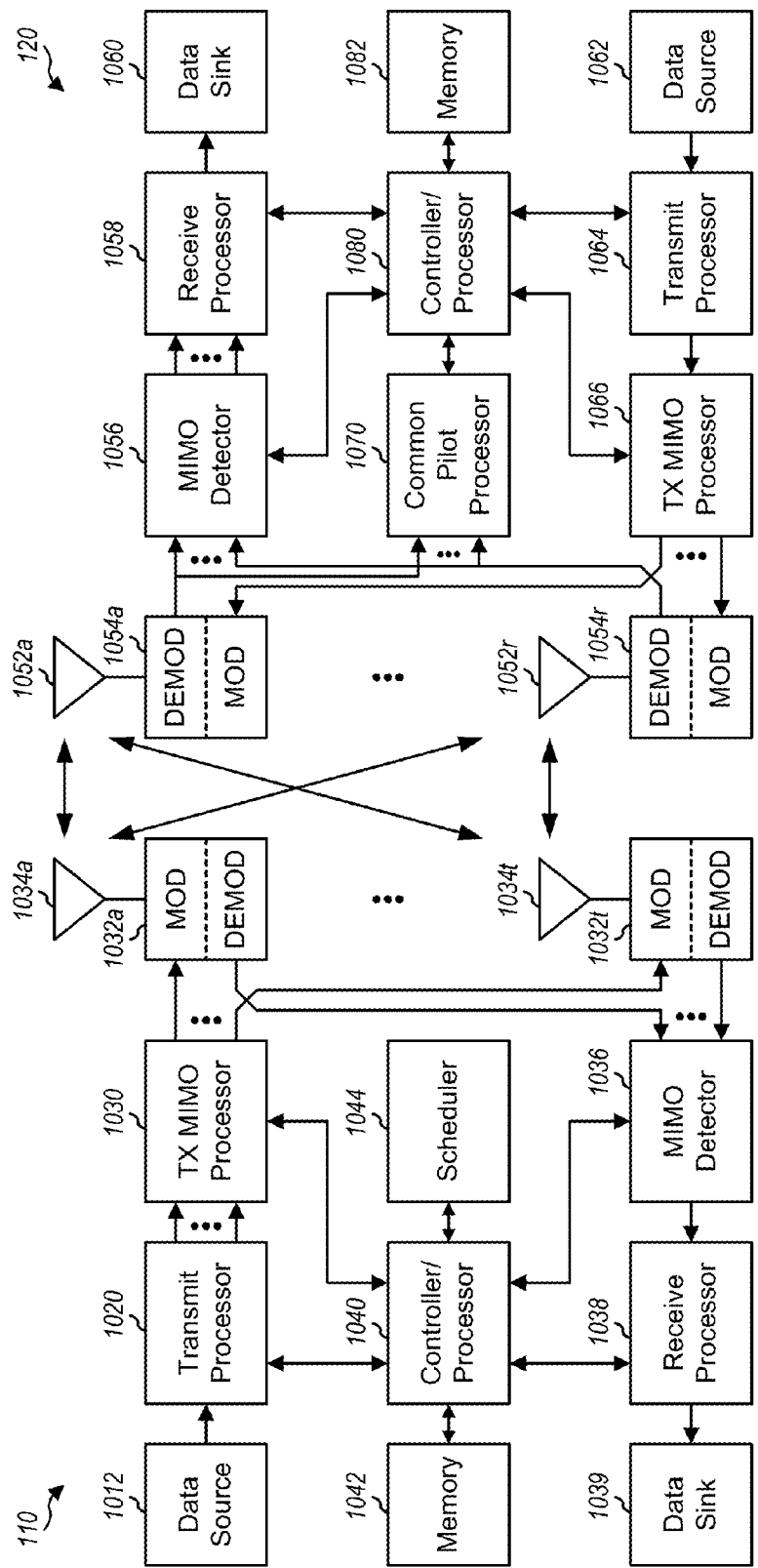
FIG. 10 shows a block diagram of a base station and a terminal.

FIG. 10 shows a block diagram of a design of base station 110 and terminal 120, which may be one of the base stations and one of the terminals in FIG. 1. In this design, base station 110 is equipped with T antennas 1034a through 1034t, and terminal 120 is equipped with R antennas 1052a through 1052r, where in general T≥1 and R≥1.

At base station 110, a transmit processor 1020 may receive data for one or more terminals from a data source 1012, process (e.g., encode, interleave, and modulate) the data for each terminal based on one or more modulation and coding schemes selected for that terminal, and provide data symbols for all terminals. Transmit processor 1020 may also process control information and provide control symbols. Transmit processor 1020 may also generate the common pilots for each cell and provide pilot symbols for all cells at the base station. A transmit (TX) multiple-input multiple-output (MIMO) processor 1030 may perform spatial processing (e.g., precoding) on the data symbols, the control symbols, and/or the pilot symbols, if applicable, and may provide T output symbol streams to T modulators (MODs) 1032a through 1032t. Each modulator 1032 may process a respective output symbol stream (e.g., for OFDM) to obtain an output sample stream. Each modulator 1032 may further process (e.g., convert to analog, amplify, filter, and upconvert) the output sample stream to obtain a downlink signal. T downlink signals from modulators 1032a through 1032t may be transmitted via T antennas 1034a through 1034t, respectively.

At terminal 120, antennas 1052a through 1052r may receive the downlink signals from base station 110 and provide received signals to demodulators (DEMODs) 1054a through 1054r, respectively. Each demodulator 1054 may condition (e.g., filter, amplify, downconvert, and digitize) a respective received signal to obtain input samples and may further process the input samples (e.g., for OFDM) to obtain received symbols. A MIMO detector 1056 may obtain received symbols from all R demodulators 1054a through 1054r, perform MIMO detection on the received symbols if applicable, and provide detected symbols. A receive processor 1058 may process (e.g., demodulate, deinterleave, and decode) the detected symbols, provide decoded data to a data sink 1060, and provide decoded control information to a controller/processor 1080. A common pilot processor 1070 may process the common pilots from the serving and neighbor cells, e.g., for channel estimation, channel quality measurement, signal strength measurement, time/frequency tracking, etc.

On the uplink, at terminal 120, data from a data source 1062 and control information from controller/processor 1080 may be processed by a transmit processor 1064, further processed by a TX MIMO processor 1066 if applicable, conditioned by modulators 1054a through 1054r, and transmitted to base station 110. At base station 110, the uplink signals from terminal 120 may be received by antennas 1034, conditioned by demodulators 1032, processed by a MIMO detector 1036 if applicable, and further processed by a receive processor 1038 to obtain the data and control information sent by terminal 120.

Controllers/processors 1040 and 1080 may direct the operation at base station 110 and terminal 120, respectively. Processor 1040 and/or other processors and modules at base station 110 may perform or direct process 400 in FIG. 4 and/or other processes for the techniques described herein. Processor 1080 and/or other processors and modules at terminal 120 may perform or direct process 600 in FIG. 6, process 800 in FIG. 8, and/or other processes for the techniques described herein. Memories 1042 and 1082 may store data and program codes for base station 110 and terminal 120, respectively. A scheduler 1044 may schedule terminals for downlink and/or uplink transmission and may provide assignments of resources for the scheduled terminals.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   determining whether to perform pilot cancellation at a terminal for a neighbor cell based on network loading, or a required signal-to-noise-and-interference ratio (SINR) of the terminal, or both; and
   when a determination is made to perform pilot cancellation,
      canceling a common pilot from the neighbor cell at the terminal,
      determining received signal quality of a serving cell at the terminal after canceling the common pilot,
      determining channel quality indicator (CQI) information based on the received signal quality, and
      sending the CQI information to the serving cell.

2. The method of claim 1, wherein the determining whether to perform pilot cancellation comprises deciding to perform pilot cancellation if the neighbor cell is one of M strongest neighbor cells or if received signal strength for the neighbor cell exceeds a threshold, where M is one or greater.

3. The method of claim 1, wherein the determining whether to perform pilot cancellation comprises determining whether to perform pilot cancellation based on information received from a serving cell, the information identifying at least one neighbor cell to perform pilot cancellation, or at least one common pilot to perform pilot cancellation, or both.

4. The method of claim 1, wherein the canceling the common pilot comprises
   obtaining a channel estimate for the neighbor cell based on a received signal at the terminal,
   estimating interference due to the common pilot from the neighbor cell based on a locally generated common pilot for the neighbor cell and the channel estimate, and
   subtracting the estimated interference from the received signal to obtain an interference-canceled signal.

5. The method of claim 1, including:
   receiving at the terminal a common pilot at a first density and a first transmit power level during a first time period;
   receiving at the terminal the common pilot at a second density and a second transmit power level during a second time period, the second density being lower than the first density, or the second transmit power level being lower than the first transmit power level, or both;
   using a first modulation and coding scheme (MCS) at the terminal during the first time period; and
   using a second MCS at the terminal during the second time period, wherein the common pilot is used for channel estimation by the terminal, and wherein the second MCS is lower than the first MCS to account for degradation in channel estimation during the second time period;
   wherein the first and second time periods are determined based on SINRs of terminals, the SINRs being high during the second time period and not high during the first time period.

6. The method of claim 1, wherein the CQI information includes an SINR estimate.

7. The method of claim 1, wherein the CQI information includes a modulation and coding scheme.

8. An apparatus for wireless communication, comprising:
   a memory coupled to at least one processor; and
   the at least one processor configured to determine whether to perform pilot cancellation for a neighbor cell based on network loading, or a required signal-to-noise-and-interference ratio (SINR) of the apparatus, or both, and, when a determination is made to perform pilot cancellation,
to cancel a common pilot from the neighbor cell,
to determine received signal quality of a serving cell after canceling the common pilot,
to determine channel quality indicator (CQI) information based on the received signal quality, and
to send the CQI information to the serving cell.

9. The apparatus of claim 8 wherein the at least one processor is configured to decide to perform pilot cancellation if the neighbor cell is one of M strongest neighbor cells or if received signal strength for the neighbor cell exceeds a threshold, where M is one or greater.

10. The apparatus of claim 8, wherein the at least one processor is configured to obtain a channel estimate for the neighbor cell based on a received signal at the apparatus, to estimate interference due to the common pilot from the neighbor cell based on a locally generated common pilot for the neighbor cell and the channel estimate, and to subtract the estimated interference from the received signal to obtain an interference-canceled signal.

11. The apparatus of claim 8, wherein the CQI information includes an SINR estimate.

12. The apparatus of claim 8, wherein the CQI information includes a modulation and coding scheme.

13. The apparatus of claim 8, wherein the at least one processor is configured to determine whether to perform pilot cancellation based on information received from a serving cell, the information identifying at least one neighbor cell to perform pilot cancellation, or at least one common pilot to perform pilot cancellation, or both.

14. An apparatus for wireless communication, comprising:
means for determining whether to perform pilot cancellation for a neighbor cell based on network loading, or a required signal-to-noise-and-interference ratio (SINR) of the apparatus, or both; and
means operable, when a determination is made to perform pilot cancellation, for
canceling a common pilot from the neighbor cell,
determining received signal quality of a serving cell after canceling the common pilot,
determining channel quality indicator (CQI) information based on the received signal quality, and
means for sending the CQI information to the serving cell.

15. The apparatus of claim 14, wherein the determining whether to perform pilot cancellation comprises deciding to perform pilot cancellation if the neighbor cell is one of M strongest neighbor cells or if received signal strength for the neighbor cell exceeds a threshold, where M is one or greater.

16. The apparatus of claim 14, wherein the canceling the common pilot includes obtaining a channel estimate for the neighbor cell based on a received signal at the apparatus, estimating interference due to the common pilot from the neighbor cell based on a locally generated common pilot for the neighbor cell and the channel estimate, and subtracting the estimated interference from the received signal to obtain an interference-canceled signal.

17. The apparatus of claim 14, wherein the determining whether to perform pilot cancellation comprises determining whether to perform pilot cancellation based on information received from a serving cell, the information identifying at least one neighbor cell to perform pilot cancellation, or at least one common pilot to perform pilot cancellation, or both.

18. The apparatus of claim 14, wherein the CQI information includes an SINR estimate.

19. The apparatus of claim 14, wherein the CQI information includes a modulation and coding scheme.

20. The apparatus of claim 14, including:
means for receiving a common pilot at a first density and a first transmit power level during a first time period;
means for receiving the common pilot at a second density and a second transmit power level during a second time period, the second density being lower than the first density, or the second transmit power level being lower than the first transmit power level, or both;
means for using a first modulation and coding scheme (MCS) during the first time period; and
means for using a second MCS during the second time period, wherein the common pilot is used for channel estimation by the apparatus, and wherein the second MCS is lower than the first MCS to account for degradation in channel estimation during the second time period;
wherein the first and second time periods are determined based on SINRs of terminals, the SINRs being high during the second time period and not high during the first time period.

* * * * *